July 17, 1951 R. C. HARIG 2,560,570
CARRIER ATTACHMENT FOR TRACTORS
Filed Feb. 28, 1949 2 Sheets-Sheet 1
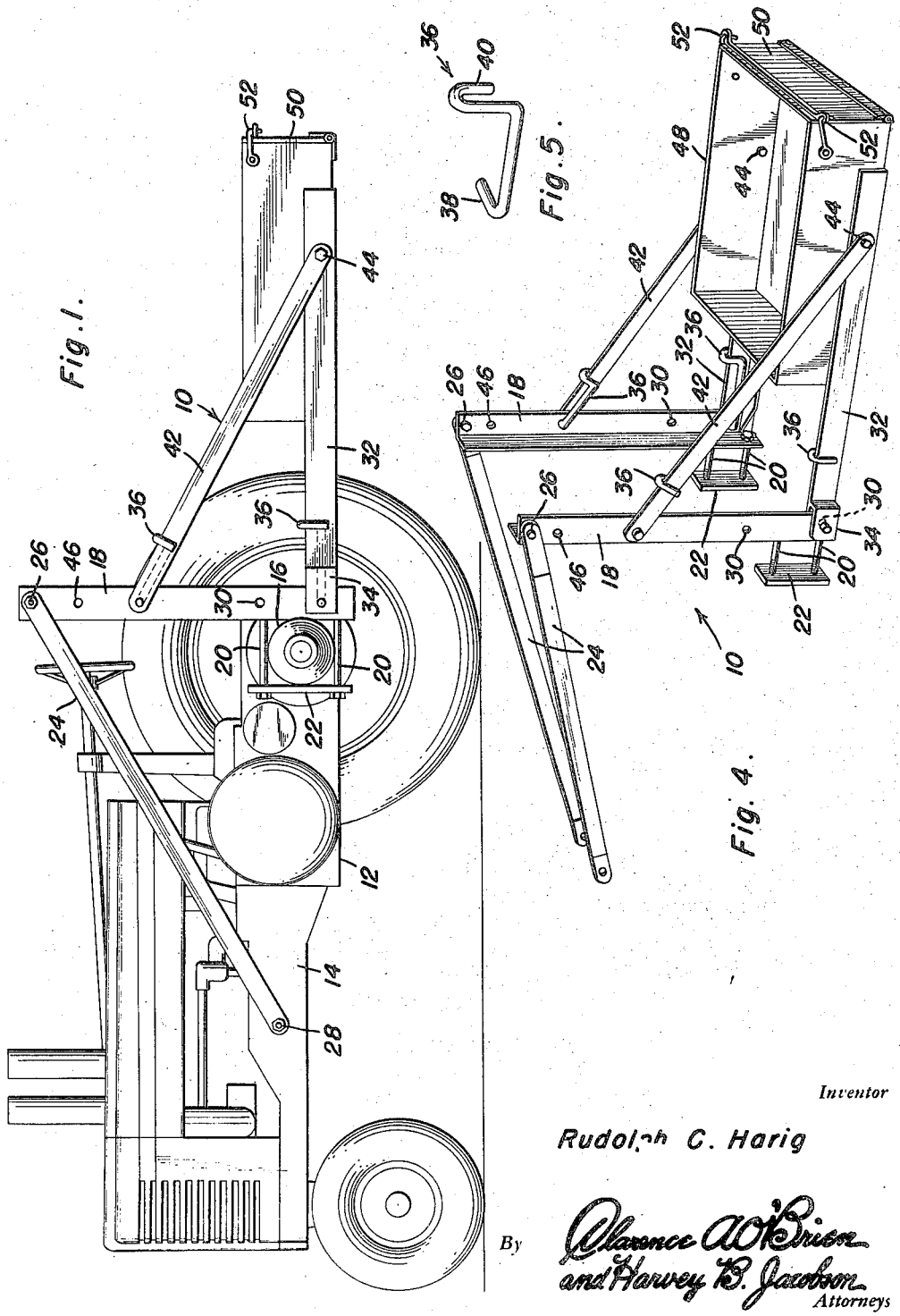
Inventor
Rudolph C. Harig
By Clarence A. O'Brien
and Harvey B. Jacobson
Attorneys

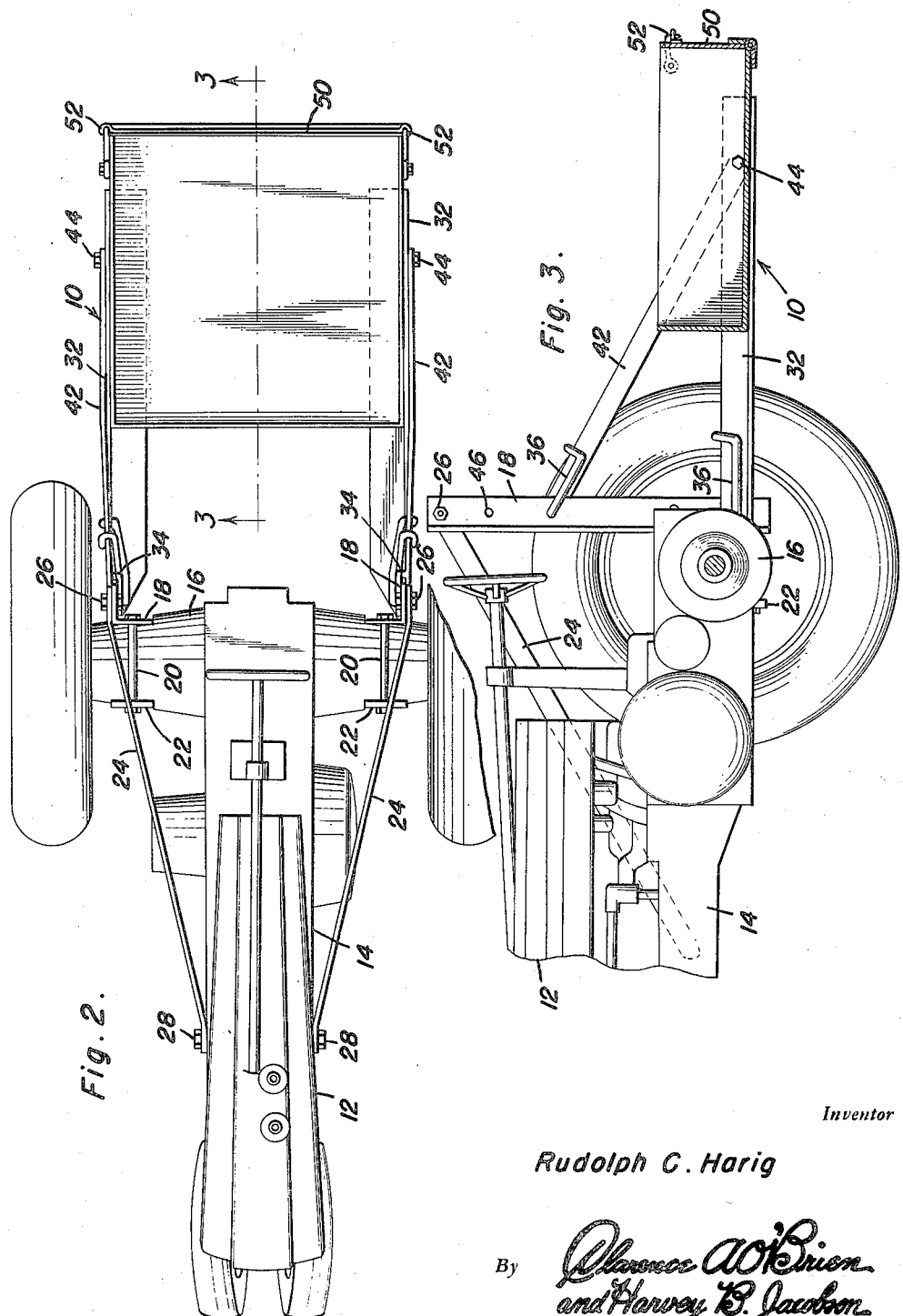

Patented July 17, 1951

2,560,570

UNITED STATES PATENT OFFICE 2,560,570

CARRIER ATTACHMENT FOR TRACTORS

Rudolph C. Harig, Algona, Iowa

Application February 28, 1949, Serial No. 78,802

1 Claim. (Cl. 224—42.44)

This invention relates to new and useful improvements and structural refinements in load carrying attachments for tractors, and the principal object of the invention is to provide a simple device of the character herein described, such as may be conveniently and expeditiously attached to a tractor and employed for carrying various types of loads.

This object is achieved by the provision of structural members, beams and struts which are attachable to the rear axle housing and other portions of the tractor frame and on which is mounted a load carrying box.

Some of the features of the invention reside in the adjustable arrangement of the beams, struts, etc., whereby the position of the box above the ground may be varied, while other features of the invention lie in the provision of means for expeditiously attaching the device to and detaching the same from the tractor frame.

Some of the advantages of the invention reside in its simplicity of construction, in its adaptability to carrying loads of different types, in its sturdiness, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention in association with the tractor;

Figure 2 is a fragmentary top plan view of the subject shown in Figure 1;

Figure 3 is a fragmentary cross-sectional view, taken substantially in the plane of the line 3—3 in Figure 2;

Figure 4 is a perspective view of the invention per se; and

Figure 5 is an enlarged perspective view of one of the fastening elements used in the invention.

Like characters of reference are employed to designate like parts in the specification and throughout the several views.

Referring now to the accompanying drawings in detail, the invention consists of a carrying attachment designated generally by the reference character 10, such as may be conveniently employed in association with any conventional tractor 12 including a frame 14 and a rear axle housing 16.

The attachment 10 embodies in its construction a pair of spaced parallel, substantially upright members 18, preferably in the form of structural angles, lower end portions of these members being equipped with pairs of bolts or studs 20 which, in turn, are provided with flat clamping plates 22, whereby the members 18 may be rigidly secured to the rear axle housing 16, as will be clearly apparent.

If desired, diagonal braces 24 may be secured to upper ends of the members 18, as at 26, and similarly secured at their lower ends as at 28 to the forward portion of the tractor frame 14, so as to rigidly retain the members 18 in position on the rear axle housing.

The rear end portions of the members 18 are provided with sets of vertically spaced apertures or openings 30, while forward end portions of rearwardly extending beams 32 are adjustably connectible to the lower end portions of the members 18, as will be presently described.

The forward end portions of the beams 32 preferably assume the form of forks 34 which straddle lower end portions of the members 18, the forks 34 being provided with apertures which are selectively registrable with the openings 30 in the beams, and a plurality of fastening elements 36 are receivable in the registering apertures and openings for the purpose of connecting the beams to the members.

Each of the elements 36 consists of a rod which has one laterally angulated end portion 38, while its remaining end portion is arcuated so as to form an inverted U-shaped hook 40, this being best illustrated in the accompanying Figure 5.

After the angulated end portion 38 of a fastening element 36 is inserted in registering apertures of the beam 18 and fork 34, the hook 40 of the fastening element may be engaged with the associated beam as illustrated in the drawings, whereby the fastening elements will be prevented from becoming accidentally or unintentionally disengaged or released from the registering apertures and the beam 32 will be connected to the associated member 18. This arrangement, of course, is employed at both sides of the device, that is, in association with each of the two members and beams, and it will be apparent that by simply disengaging the hooks 40 of the fastening elements from the beams 32 and withdrawing the angulated portion 38 of the elements from the registering apertures, the beams will become separated from the members 18 and may thereafter be adjusted vertically on the members, into selective engagement with the apertures 30, so that the height of the beams 32 above the ground may be varied as desired.

The beams 32 are reinforced by a pair of diagonal struts 42, these being connectible to rear end portions of the beams as at 44, and also to the upper end portions of the members 18 by additional fastening elements 36. For this purpose, the upper end portions of the members 18 may be formed with additional sets of vertically spaced apertures 46, to selectively receive the fastening elements which are employed for connecting the struts 42 thereto, it being understood that the upper end portions of the struts are raised and lowered on the members 18 in unison with a similar adjustment of the beams 32 on the lower end portions of the members. Alternatively, only the struts may be adjusted while the adjustment of the beams remains undisturbed, or vice versa, whereby the beams will be caused to assume inclined or declined position, as the case may be.

In any event, a load receiving box 48 is secured by welding, or the like, to the beams 32 and may be provided with a hinged tailgate or end gate 50, and conventional latches 52 may be employed for retaining this tail gate in its closed position, as shown.

It is believed that the advantages and use of the invention will be readily apparent from the foregoing disclosure and, accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a carrier attachment for tractors, the combination of a pair of substantially upright members having upper and lower ends formed with sets of openings, a pair of beams provided in end portions thereof with apertures selectively registrable with the lower set of openings in said members, a load receiving box mounted on said beams, a pair of diagonal struts connected at one end to said beams and provided at their remaining ends with apertures selectively registrable with the upper set of openings in said members, and a plurality of fastening elements receivable in the registering openings and apertures, said fastening elements being formed with angulated end portions for positioning in said openings and apertures, and hooks at their other ends for engagement with said struts and beams.

RUDOLPH C. HARIG.

REFERENCES CITED

The following references are of record in the file of this patent:

UNITED STATES PATENTS

| Number | Name | Date |
| --- | --- | --- |
| 1,385,771 | Batty | July 26, 1921 |
| 1,367,654 | Borden | Feb. 8, 1921 |
| 1,817,056 | Belgard | Aug. 4, 1931 |
| 1,823,101 | Hoffman | Sept. 15, 1931 |
| 1,865,365 | Foote | June 28, 1932 |
| 1,932,951 | Barieau | Oct. 31, 1933 |

FOREIGN PATENTS

| Number | Country | Date |
| --- | --- | --- |
| 663,788 | France | Nov. 10, 1928 |